(12) United States Patent
Lin et al.

(10) Patent No.: US 11,269,132 B1
(45) Date of Patent: Mar. 8, 2022

(54) DISPLAY PANEL BOTTOM SIDE BORDER

(71) Applicant: DELL PRODUCTS, LP, Round Rock, TX (US)

(72) Inventors: Yu-Lung Lin, Taoyuan (TW); Max Lu, Zhunan Township (TW); How-Lan Lin, Taipei (TW); Dan Odell Boice, Taipei (TW); Asim Siddiqui, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/240,257

(22) Filed: Apr. 26, 2021

(51) Int. Cl.
*F21V 8/00* (2006.01)

(52) U.S. Cl.
CPC ......... *G02B 6/0061* (2013.01); *G02B 6/0038* (2013.01); *G02B 6/0055* (2013.01)

(58) Field of Classification Search
CPC ...... G02B 6/0036; G02B 6/0058–0061; G02B 6/0038; G09G 2320/0233
See application file for complete search history.

(56) References Cited

U.S. PATENT DOCUMENTS

| | | | | |
|---|---|---|---|---|
| 5,641,219 A | * | 6/1997 | Mizobe | G02B 6/0061 362/23.13 |
| 5,921,651 A | * | 7/1999 | Ishikawa | G02B 6/0065 362/624 |
| 6,454,452 B1 | * | 9/2002 | Sasagawa | G02B 6/0061 349/65 |
| 7,458,712 B2 | * | 12/2008 | Joo | G02B 6/0061 362/623 |
| 8,016,445 B2 | | 9/2011 | Sugita et al. | |
| 8,506,153 B2 | * | 8/2013 | Chang | G02B 6/0036 362/626 |
| 9,383,503 B2 | | 7/2016 | Hwang et al. | |
| 2003/0021100 A1 | * | 1/2003 | Mabuchi | G02B 6/0071 362/620 |
| 2004/0145915 A1 | * | 7/2004 | Kim | G02B 6/0061 362/559 |
| 2015/0009783 A1 | * | 1/2015 | Hanzawa | G02B 6/0061 368/67 |

FOREIGN PATENT DOCUMENTS

| | | | | |
|---|---|---|---|---|
| CN | 101750666 B | * | 5/2012 | ........... G02B 6/0058 |
| JP | 2001126521 A | * | 5/2001 | |
| JP | 2003057642 A | * | 2/2003 | |
| JP | 2010204256 A | * | 9/2010 | ........... G02B 6/0038 |

* cited by examiner

*Primary Examiner* — Mariceli Santiago
(74) *Attorney, Agent, or Firm* — Larson Newman, LLP

(57) ABSTRACT

A display device includes a light source arranged to emit light along a first edge of the display device, and aa light guide plate arranged go receive the emitted light at a minor surface of the light guide plate. The light guide plate includes prismatic elements configured to reemit the light out a first major surface of the light guide plate. A first region of the light guide plate has a first portion of the prismatic elements arranged in a first density to provide a first brightness of the reemitted light reemitted. A second region of the light guide plate has a second portion of the prismatic elements arranged in a second density to provide a second brightness of the reemitted light reemitted. The first region is provided substantially along a first edge of the first major surface, and the second region is provided along a second, a third, and a fourth edge of the first major surface. The first brightness is brighter than the second brightness.

20 Claims, 6 Drawing Sheets

Bright Border (Artifact)

DISPLAY PANEL BOTTOM SIDE BORDER

FIELD OF THE DISCLOSURE

This disclosure generally relates information handling systems, and more particularly relates to a bottom side border for a display panel in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A display device may include a light source arranged to emit light along a first edge of the display device, and aa light guide plate arranged go receive the emitted light at a minor surface of the light guide plate. The light guide plate may include prismatic elements configured to reemit the light out a first major surface of the light guide plate. A first region of the light guide plate may have a first portion of the prismatic elements arranged in a first density to provide a first brightness of the reemitted light reemitted. A second region of the light guide plate may have a second portion of the prismatic elements arranged in a second density to provide a second brightness of the reemitted light reemitted. The first region may be provided substantially along a first edge of the first major surface, and the second region may be provided along a second, a third, and a fourth edge of the first major surface. The first brightness may be brighter than the second brightness.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
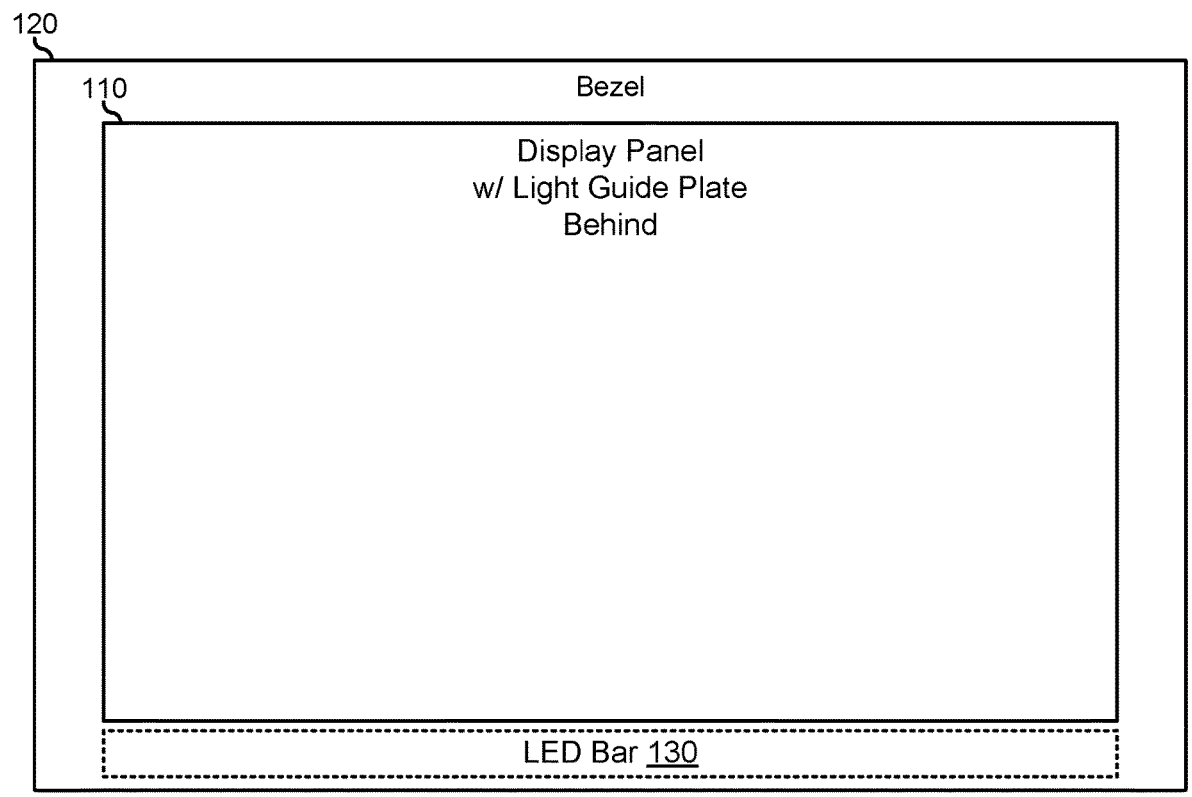
FIG. 1 illustrates a display device according to an embodiment of the current disclosure.

FIG. 1 illustrates a display device 100. Display device 100 represents a display device for a wide variety of display applications including for information handling systems such as a display for a laptop computer or a monitor, for a television device, an information display, or the like. Display device 100 includes a display panel 110 surrounded by a bezel 120. Display panel 110 represents a liquid crystal display panel that is back lit utilizing a light guide plate that directs light from a light emitting diode (LED) bar 130 at the bottom of the display panel outward toward a viewer of display device 100. LED bar 130 is housed within bezel 120. The details of display devices are known in the art and will not be further described herein except as needed to illustrate the current embodiments.

Figure 2:
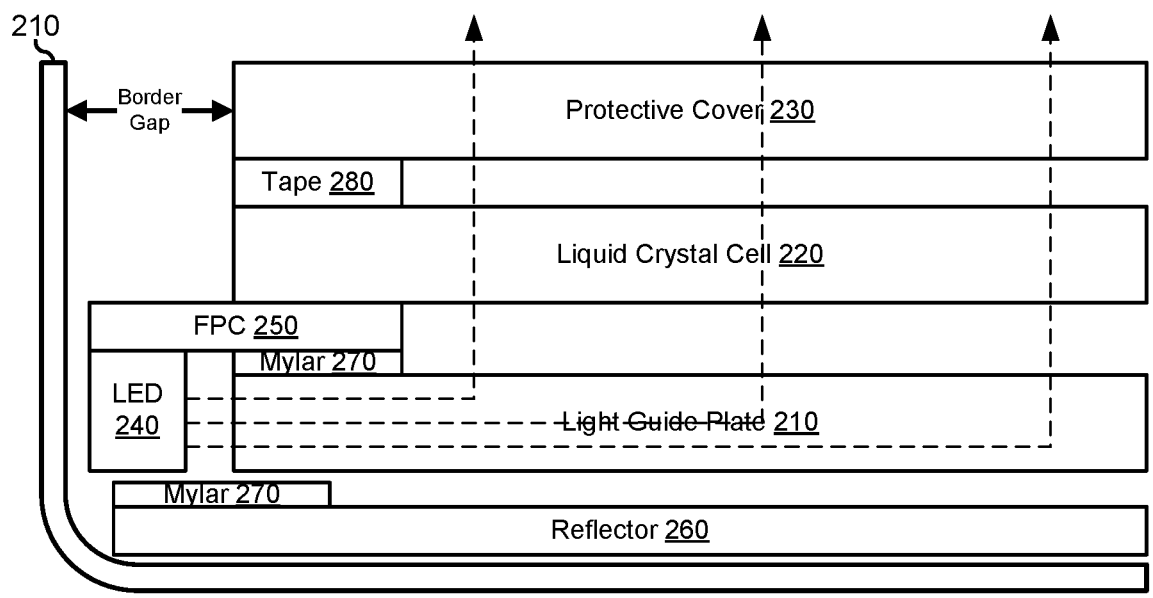
FIG. 2 illustrates a side cutaway view of a display device according to an embodiment of the current disclosure.

FIG. 2 is a cutaway side view of a display panel 200 similar to display panel 100. Display panel 200 includes a frame 210, a light guide plate 210, a liquid crystal cell 220, a protective cover 230, a LED bar 240, a flexible printed circuit (FPC) 250, a reflector 260, mylar film 270, and double sided tape 280. Frame 210 operates to retain the elements of display panel 100 as needed or desired. Light guide plate 210 operates to receive light emitted from LED bar 240 and to direct the received light outward (upward) through liquid crystal cell 220 and protective cover 230 toward a viewer of display device 200, as illustrated by the dashed arrows. Generally, the light emitted by LED bar 240 includes a broad spectrum of visible light frequencies. Liquid crystal cell 220 operates to filter the incident light from light guide plate 210 to form viewable information on display device 200.

Protective cover 230 is adhered to liquid crystal cell 230 by double sided tape 280, and may further be retained by frame 210, as needed or desired. Protective cover 230 provides a tough, scratch resistant surface that protects liquid crystal cell 220 and the other components of display device 200, as needed or desired. LED bar 240 is connected to FPC 250 that provides driving circuitry for the LED bar, and for other features of display device 200 as needed or desired. reflector 260 represents a film which may be adhered to one side of light guide plate 210 to reflect any light emitted away liquid crystal cell 220 back toward the liquid crystal cell. Mylar film 270 is provided to selectively darken regions of display panel 200 as needed or desired, and is typically provided in a dark color, such as black mylar film. Display panel 200 may include other elements, as needed or desired, such as polarizers, privacy layers configured to reduce the viewing angle, or other elements.

Figure 3:
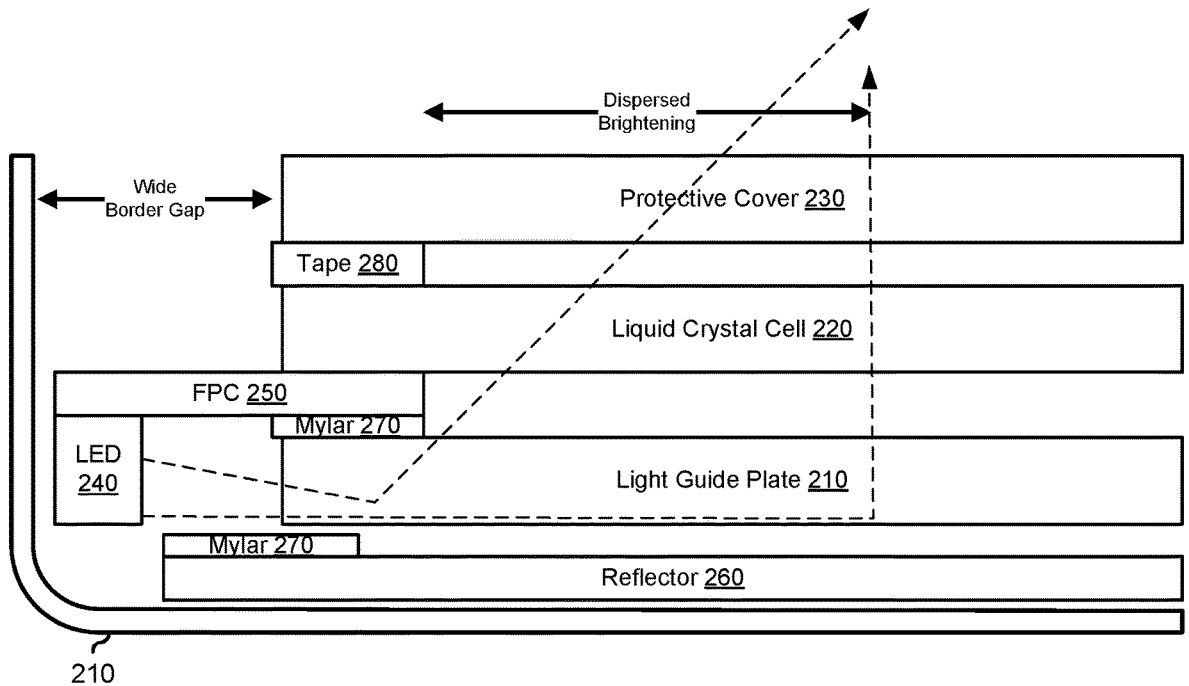
FIG. 3 illustrates various embodiments of the display device of FIG. 2.
Figure 3:
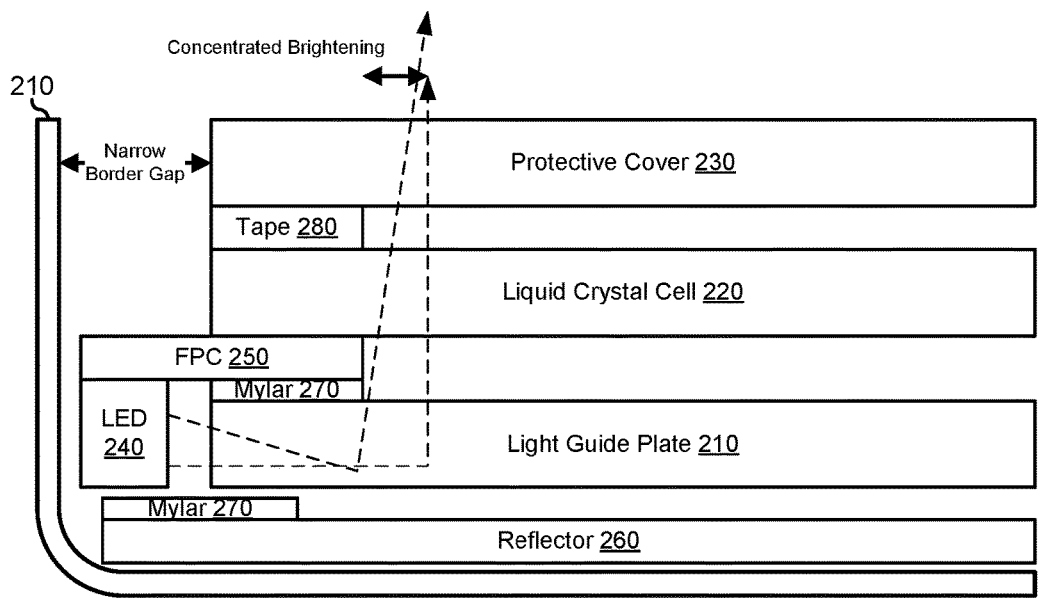

The demand for narrower borders is a constant challenge in the design and manufacture of display devices such as display devices 100 and 200. In particular, narrowing the border gap of a display device has resulted in the narrowing of the distance between the LED bar and the light guide plate. As such, the light emitted from the LED bar is less columnated when it enters the light guide plate, and reflections in the light guide plate can be seen as a brightening along the bottom border of the display panel. This effect is illustrated in FIG. 3, where display device 200 is illustrated in a first case 200A where the border gap is wide and the commensurate distance between LED bar 240 and light guide plate 210 is wide (for example 8.85 mm). Here, light from LED bar 240 is highly columnated upon entering light guide plate 210 and so, the dispersion of any non-columnated light emitted from the LED bar is widely dispersed, and so does not result in any visible artifacts in the displayed image.

FIG. 3 further illustrates a second case 200B where the border gap is narrow and the commensurate distance between LED bar 240 and light guide plate 210 is narrow (for example 5.5 mm). Here, light from LED bar 240 is less columnated upon entering light guide plate 210, and so the dispersion of any non-columnated light emitted from the LED bar is concentrated, resulting in a discernable brightening of the displayed image along the bottom of the display panel. The typical approach to minimize the brightening along the bottom edge of a display panel includes the introduction of black mylar film, such as mylar film 270, to reduce the amount of reflected light. However, the shrinking gap between the LED bar and the light guide plate has reduced the effectiveness of this approach.

Figure 4:
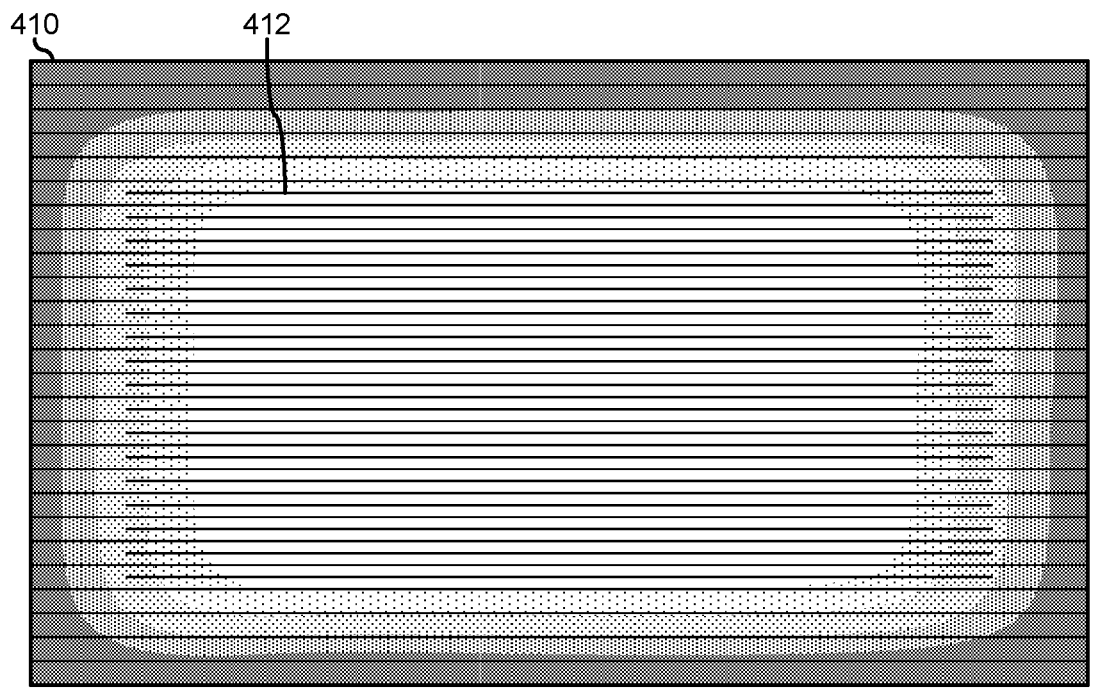
FIG. 4 illustrates a brightness pattern of a display device as may be known in the art.
Figure 4:
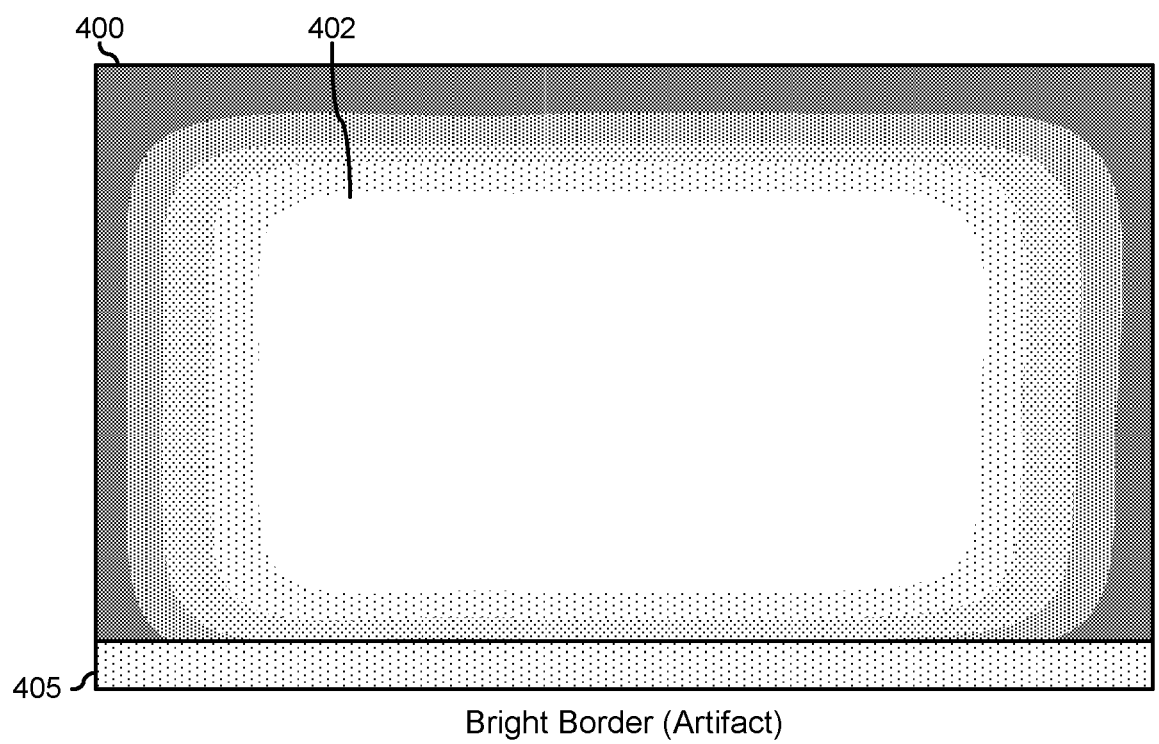

FIG. 4 illustrates a display panel 400 in accordance with the prior art. Here, display panel 400 is designed to have a brighter viewing area 402 in the center of the display panel. Display panel 400 is also shown with the brighter portion 405 at the bottom of the display panel that is an artifact of moving the LED bar closer to the light guide plate, as described above. The light guide plate 410 that is associated with display panel 400 is illustrated as providing a brightness pattern. Light guide panel 410 operates to provide a designed brightness pattern. For example light guide panel 410 may be fabricated by embedding prismatic lines in the light guide panel, by embedding prismatic bumps in the light guide panel, or by other prismatic elements embedded within the light guide panel, as needed or desired.

Here, light guide panes 410 is illustrated with embedded prismatic lines to deflect the light from the LED bar at the bottom of the display device outward toward the viewer. The brightness pattern is created based upon the density of the prismatic elements across the light guide panel. Thus, as illustrated here, the prismatic elements of light guide panel 410 are prismatic lines, and, as can be seen, the density of the prismatic lines is lower at the edges and is higher within a pattern region 412 that corresponds with brighter viewing portion 402. In an exemplary case, light guide plate 410 may be designed to provide a brightness of around 300 NITs in pattern region 412 and to provide a brightness of around 250 NITs at the edges. The details of providing brightness patterns in a light guide plate are known in the art, and will not be further described herein except as needed to illustrate the current embodiments.

Figure 5:
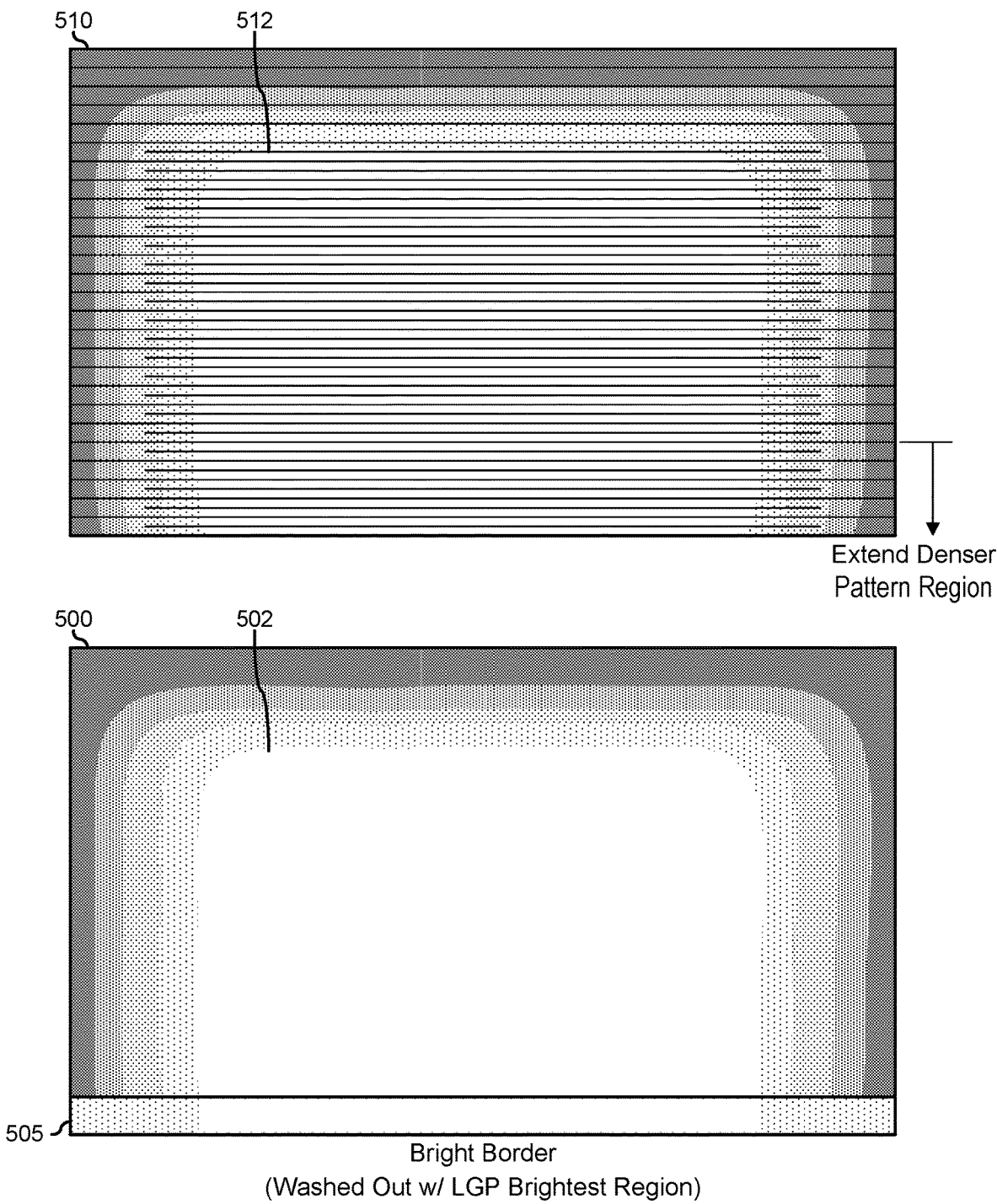
FIG. 5 illustrates a brightness pattern of a display device according to an embodiment of the current disclosure.

FIG. 5 illustrates a display panel 500 in accordance with an embodiment of the current disclosure. Here, display panel 500 is designed to have a brighter viewing area 502 in the center of the display panel that extends to the bottom of the display panel, into the brighter portion 505 at the bottom of the display panel. Here, brighter viewing area 502 washes out brighter portion 505, making it less visibly distinct by contrast. The light guide plate 510 that is associated with display panel 500 is illustrated as providing a brightness pattern. Light guide panel 510 operates similarly to light guide plate 410 to provide a designed brightness pattern. For example light guide panel 510 may be fabricated by embedding prismatic lines in the light guide panel, by embedding prismatic bumps in the light guide panel, or by other prismatic elements embedded within the light guide panel, as needed or desired.

Here, light guide panes 510 is illustrated with embedded prismatic lines to deflect the light from the LED bar at the bottom of the display device outward toward the viewer. The brightness pattern is created based upon the density of the prismatic elements across the light guide panel. Thus, as illustrated here, the prismatic elements of light guide panel 510 are prismatic lines, and, as can be seen, the density of the prismatic lines is lower at the edges and is higher within a pattern region 512 that corresponds with brighter viewing portion 502, and the higher density region of the brighter viewing portion extends to the bottom of light guide plate 510. In an exemplary case, light guide plate 510 may be designed to provide a brightness of around 300 NITs in pattern region 512 and to provide a brightness of around 250 NITs at the side and top edges.

Here, as opposed to the typical approach of providing darkening to eliminate the bright region along the bottom of the display panel, such as through the use of darkened mylar, the current embodiment seeks to provide brightening to the region along the bottom of the display panel to wash out the bright region. Note that, as used herein, the LED bars are provided along a bottom edge of the associated display device, but this is not necessarily so. In other embodiments, a LED bar may be located along a top side, along one or the other of the sides, or along a combination of sides, as needed or desired. In any of these cases, the provision of denser prismatic elements within the associated light guide plate will be located as needed or desired to wash out the artifact bright region near the LED bar, as needed or desired.

Figure 6:
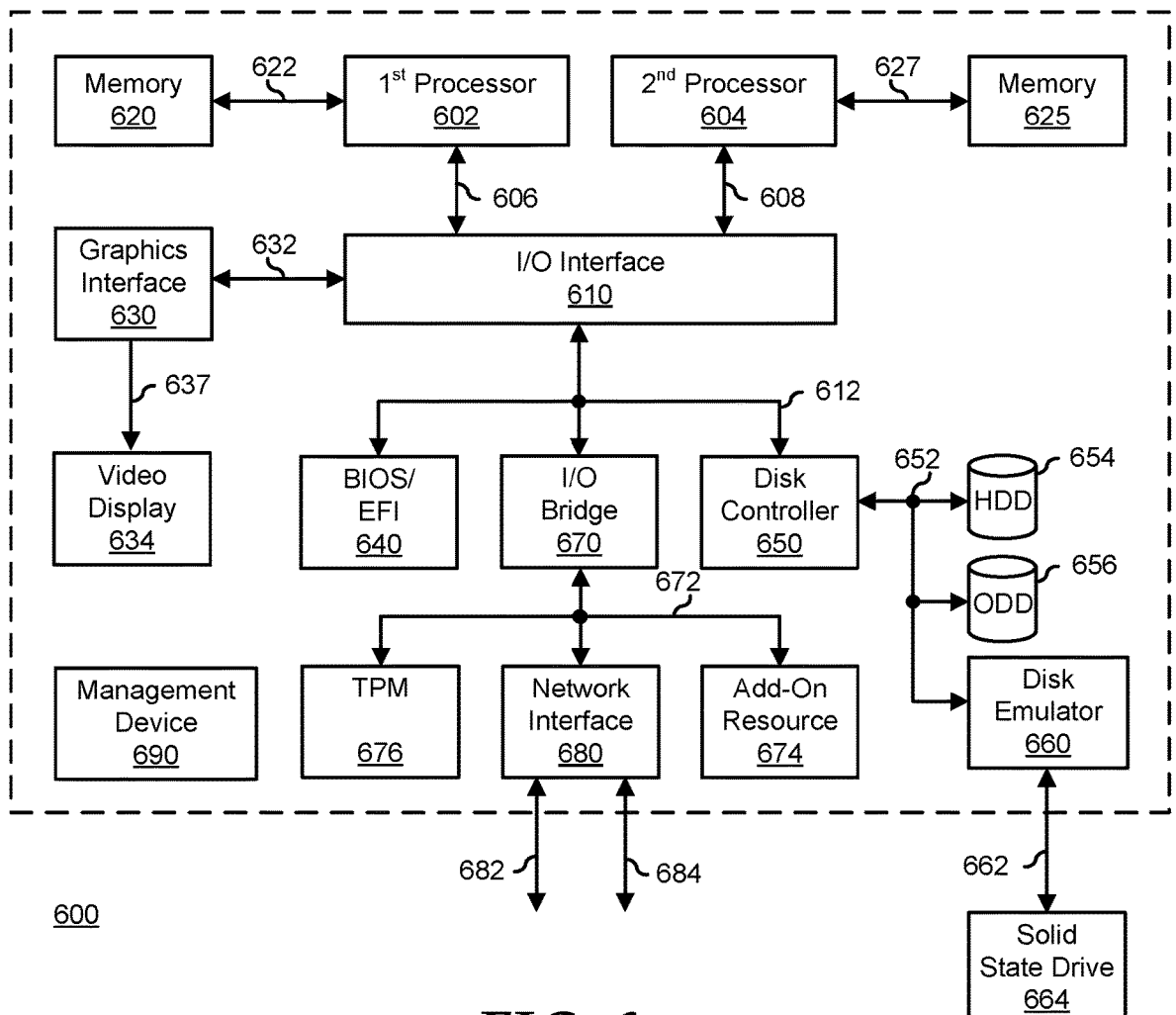
FIG. 6 is a block diagram illustrating a generalized information handling system according to another embodiment of the current disclosure.

FIG. 6 illustrates a generalized embodiment of an information handling system 600. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below, and operates to perform one or more of the methods described below. Information handling system 600 includes a processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 662, an I/O bridge 670, one or more add-on resources 674, a trusted platform module (TPM) 676, a network interface 680, a management device 690, and a power supply 695. Processors 602 and 604, I/O interface 610, memory 620, graphics interface 630, BIOS/UEFI module 640, disk controller 650, HDD 654, ODD 656, disk emulator 660, SSD 662, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632, and provides a video display output 636 to a video display 634. In a particular embodiment, information handling system 600 includes separate memories that are dedicated to each of processors 602 and 604 via separate memory interfaces. An example of memories 620 and 630 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 1394 (Firewire) interface, a proprietary interface, or a combination thereof. Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612, or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600. Management device 690 can operate off of a separate power plane from the components of the host environment so that the management device receives power to manage information handling system 600 when the information handling system is otherwise shut down. An example of management device 690 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 690 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A display device, comprising:
  a light source arranged to emit light along a first edge of the display device; and
  a light guide plate arranged to receive the emitted light at a minor surface of the light guide plate, the light guide plate including a plurality of prismatic elements configured to reemit the light out a first major surface of the light guide plate, wherein the light guide plate includes a first region having a first portion of the prismatic elements arranged in a first density to provide a first brightness of the light reemitted out the first major surface, and a second region having a second portion of the prismatic elements arranged in a second density to provide a second brightness of the light reemitted out the first major surface, wherein the first region is provided substantially along a first edge of the first major surface, the first edge being at the minor surface, wherein the second region is provided along a second, a third, and a fourth edge of the first major surface, and wherein the first brightness is brighter than the second brightness.

2. The display device of claim 1, wherein the light source is a light emitting diode bar.

3. The display device of claim 1, wherein the emitted light is in a visible light spectrum.

4. The display device of claim 1, wherein the first density of prismatic elements is denser than the second density of prismatic elements.

5. The display device of claim 1, wherein the prismatic elements include prismatic bumps formed in the light guide plate.

6. The display device of claim 1, wherein the prismatic elements include prismatic lines formed in the light guide plate.

7. The display device of claim 1, further comprising:
  a reflector situated adjacent to a second major surface of the light guide plate.

8. The display device of claim 1, further comprising:
  a liquid crystal cell configure to receive the reemitted light from the light guide plate at a first major surface of the liquid crystal cell, and to provide a patterned image at a second major surface of the liquid crystal cell.

9. The display device of claim 1, wherein the first brightness is not less than 300 nits, and wherein the second brightness is not greater than 250 nits.

10. A method, comprising:
  emitting, by a light source of a display device situated along a first edge of the display device, light;
  receiving, at a first minor surface of a light guide plate of the display device, the emitted light;
  reemitting, at a first region of a first major surface of the light guide plate, the light at a first brightness, wherein the first region includes a first plurality of prismatic elements arranged in a first density to provide the first brightness, and wherein the first region is provided substantially along a first edge of the first major surface, the first edge being at the minor surface; and
  reemitting, at a second region the first major surface, the light as a second brightness, wherein the second region includes a second plurality of prismatic elements arranged in a second density to provide the second brightness, wherein the second region is provided along a second, a third, and a fourth edge of the first major surface, and wherein the first brightness is brighter than the second brightness.

11. The method of claim 10, wherein the light source is a light emitting diode bar.

12. The method of claim 10, wherein the emitted light is in a visible light spectrum.

13. The method of claim 10, wherein the first density of prismatic elements is denser than the second density of prismatic elements.

14. The method of claim 10, wherein the prismatic elements include prismatic bumps formed in the light guide plate.

15. The method of claim 10, wherein the prismatic elements include prismatic lines formed in the light guide plate.

16. The method of claim 10, further comprising:
  situating a reflector adjacent to a second major surface of the light guide plate.

17. The method of claim 10, further comprising:

receiving, by a liquid crystal cell of the display device, the reemitted light from the light guide plate at a first major surface of the liquid crystal cell; and providing a patterned image at a second major surface of the liquid crystal cell.

18. The method of claim 10, wherein the first brightness is not less than 300 nits, and wherein the second brightness is not greater than 250 nits.

19. A light guide plate for a display device, the light guide plate comprising:

a minor surface at a first edge of the light guide plate, the minor surface configured to receive light emitted by the display device; and a first major surface configured to reemit the emitted light, wherein the light guide plate includes a plurality of prismatic elements configured to reemit the light out the first major surface, wherein the light guide plate includes a first region having a first portion of the prismatic elements arranged in a first density to provide a first brightness of the light reemitted out the first major surface, and a second region having a second portion of the prismatic elements arranged in a second density to provide a second brightness of the light reemitted out the first major surface, wherein the first region is disposed substantially along a first edge of the first major surface, the first edge being at the minor surface, wherein the second region is provided along a second, a third, and a fourth edge of the first major surface, and wherein the first brightness is brighter than the second brightness.

20. The light guide plate of claim 19, wherein the prismatic elements include at least one of prismatic bumps formed in the light guide plate, and prismatic lines formed in the light guide plate.

* * * * *